United States Patent
Shekh-Yusef et al.

(10) Patent No.: US 10,783,766 B2
(45) Date of Patent: Sep. 22, 2020

(54) METHOD AND SYSTEM FOR WARNING USERS OF OFFENSIVE BEHAVIOR

(71) Applicant: Avaya Inc., Santa Clara, CA (US)

(72) Inventors: Rifaat Shekh-Yusef, Belleville (CA); John C. Lynch, Belleville (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/113,763

(22) Filed: Aug. 27, 2018

(65) Prior Publication Data
US 2020/0066133 A1   Feb. 27, 2020

(51) Int. Cl.
| | |
|---|---|
| G08B 21/00 | (2006.01) |
| G08B 21/18 | (2006.01) |
| G10L 25/21 | (2013.01) |
| G06F 3/16 | (2006.01) |
| H04R 29/00 | (2006.01) |

(52) U.S. Cl.
CPC ........... G08B 21/182 (2013.01); G06F 3/165 (2013.01); G10L 25/21 (2013.01); H04R 29/001 (2013.01)

(58) Field of Classification Search
CPC ....... G08B 21/182; G06F 3/165; G10L 25/21; H04R 29/001
See application file for complete search history.

(56) References Cited

U.S. PATENT DOCUMENTS

| | | | |
|---|---|---|---|
| 7,925,508 B1 | 4/2011 | Michaelis | |
| 2015/0104049 A1* | 4/2015 | Noda | G06F 3/012 |
| | | | 381/303 |
| 2018/0047417 A1* | 2/2018 | Gummadi | G08B 23/00 |

* cited by examiner

Primary Examiner — Phung Nguyen
(74) Attorney, Agent, or Firm — Sheridan Ross P.C.

(57) ABSTRACT

The methods and systems of the present disclosure can set at least one threshold for properties of at least one sound, where the at least one threshold comprises a first threshold, and where the at least one sound comprises a first sound received at a first device; monitor changes in properties of the first sound over time at the first device; detect a first violation of the first threshold for the first sound; and provide a first notification based on the detection of the first violation.

20 Claims, 6 Drawing Sheets

METHOD AND SYSTEM FOR WARNING USERS OF OFFENSIVE BEHAVIOR

FIELD

The disclosure relates generally to communications and particularly to sound monitoring and alerting for communication systems.

BACKGROUND

Sounds vary in frequency and volume. When people speak, they are often unaware of exactly how their voice is transmitting, including the volume of their voice. A person may use an inappropriate or undesirable volume of voice when their emotions change, for example if they get upset or excited, and it can be difficult for a person to accurately judge the characteristics of their voice. For example, it can be especially difficult for a person to judge the volume of their voice in varying acoustic environments or when they are distracted. However, some characteristics of a person's voice (such as a certain frequency or volume) can be a problem for other people hearing the voice. It may be unpleasant for the other people or may cause the other people to be distracted or to not be able to hear other noises that they would like to hear.

There is a need for a system and a device that can monitor one or more voices and alert for conditions related to the voices.

SUMMARY

If a person is making a sound that is offensive (e.g., too loud or disturbing others), the person making the sound may not be immediately aware that it is offensive, and a method and system to notify the person of the offensiveness of the sound would be useful. This includes the sound of a person's voice, which may vary in many properties, including but not limited to volume, pitch, pace, and frequency. Variations in voice may be problematic for many reasons.

For example, many work environments are designed for people to share a common space to facilitate collaboration or increase the density of people in an area. Examples of this would be collaborative teams or call centers. These environments may have little acoustic isolation between individuals. When staff in these environments are talking with people outside the group such as via phone call or conference session, unwanted audio can disrupt other staff within the shared space.

Thus, it would be advantageous to have methods and systems of direct and immediate feedback to people when their activities are loud enough to disrupt others that are not engaged in the same activity. However, there are no current solutions to this problem, and correction depends on human behavior. The offended person can interrupt the offending person and ask that they change their behavior; however, this may not be an ideal solution (e.g., the offended person may not want to speak with the offending person, or the offended person may be busy and not want to interrupt the offending person). Also, any interruption to correct the problem necessarily happens after the offense has occurred, and in many cases after the offense has repeatedly occurred. There are no known solutions beyond creating acoustic isolation with walls or physically altering the movement of people.

Various embodiments of the present disclosure use a sound detector (e.g. a microphone) of a device, which may be an active communication device that is engaged in a communication session. In some aspects, the power level measured (e.g., the microphone is monitored for power levels) and an alarm is raised when the level is beyond a threshold. This alarm is then presented to the user during, or even prior to, when the offensively loud activity is occurring. For example, settings could be set so that an alert happens prior to the volume (e.g., the power level) reaching a certain threshold that would disturb others (e.g., a first threshold can be set that is at a lower level than a level (e.g., a second threshold) where the sounds would disturb others so that a volume of the soon-to-be offending sounds are reduced prior to the volume reaching the offending level). In various embodiments, multiple thresholds may be set for different variables, and one or more may be applied at a same time (e.g., two different thresholds for levels of a sounds' property/properties, or different thresholds for amounts of time and levels of a sounds' property/properties).

The alert, or a presentation or triggering of the alert, may depend on any variable. For example, a type of alert may depend on a user activity. In various embodiments, if the user is on a call using a device, the alert could be a subtle audible tone mixed in with a receive audio (e.g., an audible noise played back to the user), a haptic feedback, or a visual indicator that shows (e.g., a light that flashes) on the device. In some embodiments, in the case of a video call, the alarm can be presented as a visual indicator on the screen of the offender.

In certain aspects, the alert can have one or more filters. For example, the alert can have one or more low pass filters. Low pass filters may advantageously exclude sounds having a shorter duration but account for sounds that have a longer duration (e.g., exclude a cough but pick up long sustained laughter). Such filter(s) may be helpful for people who are unaware of their noises (e.g., it is common for people in an emotional state such as anger to raise their voice without concern for nearby people who are not part of the same conversation). Thus, embodiments of the present disclosure advantageously can provide near immediate feedback so that an individual can change their behavior quickly and without any need of intervention from others after the behavior.

In communications systems, devices have the ability to monitor surroundings and notify people. Settings related to the monitoring and notifying are customizable and configurable by a user or by an administrator. For example, a user's device has the ability to communicate notifications to the user, and these notifications can be triggered by various criteria. Therefore, methods and systems of monitoring and detecting sounds (such as voices) are needed that can provide a notification (also referred to herein as alert and/or alarm) that the sound is occurring.

Various embodiments disclosed herein may be implemented without use of a communication system. Thus, methods and systems may be implemented using a device that (although it may be capable of transmission, relay, interconnect, control, or to otherwise manipulate information or data from at least one transmitter to at least one receiver) does not transfer or manipulate information or data from any transmitter or receiver.

The present disclosure is advantageously directed to systems and methods that address these and other needs by providing monitoring of various properties of sounds, including one or more voices, and notifying a user (also referred to herein as a person and/or party) in some manner based on changes in the property/properties. A user, as described herein, includes a user of a device that receives the sounds or provides a notification, and as such may be referred to as a recipient and/or a receiving user.

In certain aspects, a user using an electronic device (e.g., a communication device or user device) is speaking while sound (e.g., properties of the user's voice) are received by the device and monitored.

In various embodiments of the present disclosure, sounds that have variable properties are monitored using sensors on a device that may be built-in sensors (e.g., a microphone), and a recipient is notified by the device (or systems or other devices associated with the device) of the sounds meeting limits defined by settings. In some aspects, a power level of the one or more sensors may be the property (e.g., the variable) that is monitored.

Embodiments disclosed herein can advantageously provide sound detection methods and systems that enable the monitoring of sounds that are occurring. Embodiments disclosed herein provide improved monitoring systems and methods that can detect and analyze sounds, and notify a recipient when there is a specified sound occurring.

Such embodiments are advantageous because, for example, they allow users to monitor for and detect specified sounds that are occurring, even if the sounds are inaudible.

Embodiments of the present disclosure include systems and method that can actively monitor an auditory environment. For example, an electronic device can monitor the auditory environment using an application, microphone, and/or one or more vibrational sensors.

The methods and systems disclosed herein can send an alarm to one or more device(s), user(s), and/or service(s), if one or more sounds that meet limits occur. In various embodiments of this disclosure, sounds received by a device microphone and/or sensor are analyzed to determine if they exceed thresholds (e.g., limits of one or more properties), and an alert is provided, thereby allowing a user or users adjacent to the sound, or causing the sound, to alter the properties of the sound.

In various embodiments, at least one threshold is set for properties of at least one sound, where the at least one threshold includes at least a first threshold, and where the at least one sound includes at least a first sound, receiving the first sound at the first device, monitoring changes in properties of the first sound over time at the first device, detecting a first violation of the first threshold for the first sound, and providing a first notification based on the detection of the first violation. In certain aspects, the first sound is a voice of the first user, and the first notification is an increase in a side tone gain at the first device.

In certain aspects, the notification that is provided may be an adjustment to the sidetone gain. Sidetone (or side tone) is, for example, the sound of a speaker's voice as received at his or her own ears. In terms of some user devices, the sidetone gain is audio that is picked up from the microphone of the user device and transmitted to the speaker (speakerphone, handset or headset speaker) of the user device so that the user has an audio feedback that the phone is working. Sidetone gain can also be defined as an amount that a user's own speech is amplified in their own ear. Thus, for a user device into which the user is speaking, increasing the sidetone gain would cause the user to hear their own voice (e.g., picked up from the microphone of the user device) to be played back (e.g., via speakers of the device) in their own ear. This can be advantageous because the natural human response to hearing themselves louder is to lower their voice so increasing the sidetone gain would amplify their own speech in their own ear.

The threshold can be any type of threshold, including a specified level of a property or properties of the sound or a time limitation. The threshold can be one or more limits and one or more variables, for example, different levels of volume and/or different amounts of time. Various thresholds can be combined in any manner. Thus, the thresholds may be any one or more types of same thresholds or different thresholds. Also, some thresholds may be dependent on other thresholds. For example, a certain number of one type of threshold may need to be met with another type of threshold (e.g., a certain amount of cumulative sounds that exceed a volume limit within a specified amount of time).

The sound can be any sound that is monitored at a device. For example, the sound can be a sound that is occurring adjacent to a device or adjacent to a user of the device. The sound can be multiple sounds that can be related or unrelated, such as multiple voices on a conference call or various noises made by people within a lunch meeting. Multiple voices or sounds may be referred to herein as a "sound" or "sounds" or may be referred to herein as different "sounds" such as a first, second, third, etc., sound.

The notification that is provided may be provided in any manner. For example, the notification may be presented at a device, sent to one or more people and/or a service, and may be sent using a recipient's mobile device and/or other devices. The notification may be referred to as an alert or alarm, and may include multiple notifications that may be the same or different. The notifications are customizable and can be an option presented to and configurable by a user, or presented to and configurable by an administrator. In various embodiments, the sounds that exceed one or more thresholds are detected using built-in sensors on a device (e.g., a microphone), and a user is notified of the sounds by the device or systems associated with the device.

The notifications may be configured to be dependent on the settings or thresholds set. The notifications may be any type of notification, such as audible, visual, and/or haptic. For example, the notification may be one type of notification when one threshold is met and a different type of notification when another threshold is met. The notifications may be dependent based on a type of device. For example, if the notification is sent using one type of device, it may be a first type of notification; however, if the notification is sent using another type of device, it may be a second type of notification. Also, if the sounds are received at one type of device, the notification may be a first type of notification; however, if the sounds are received at a different type of device, the notification may be a second type of notification. The notifications can be one or more of the same or various types of notifications.

In various embodiments, filters may be used in embodiments disclosed herein. The filters may be configured and used in any manner. For example, one or more filters may be set up so that the methods and systems disclosed herein ignore certain types of sounds (e.g., a filter may be used to ignore short bursts that exceed a threshold). This may be useful when there are sounds that a person doesn't care to monitor or when there are anomalous sounds. Also, such filters may advantageously not trigger an alert for anomalous sounds (e.g. a brief increase in volume) but may trigger an alert as a property of a sound increases or changes over time (e.g., a voice that gets louder over time). The filters can be one or more of the same or various types of filters.

Embodiments disclosed herein may include methods and systems, including: setting, by a microprocessor of a first device, at least one threshold for properties of at least one sound, where the at least one threshold includes a first threshold, and where the at least one sound includes a first sound; receiving the first sound at the first device; monitoring, by the microprocessor, changes in properties of the first sound over time at the first device; detecting, by the microprocessor, a first violation of the first threshold for the first sound; and providing, by the microprocessor, a first notification based on the detection of the first violation.

Embodiments disclosed herein may include methods and systems, including: one or more processors; memory storing one or more programs for execution by the one or more processors, the one or more programs including instructions for: setting at least one threshold for properties of at least one sound, where the at least one threshold includes a first threshold, and where the at least one sound includes a first sound received at a first device; monitoring changes in properties of the first sound over time at the first device; detecting a first violation of the first threshold for the first sound; and providing a first notification based on the detection of the first violation.

Embodiments disclosed herein may include methods and systems, including: a tangible and non-transient computer readable medium including microprocessor executable instructions that, when executed by the microprocessor, perform at least the following functions: setting at least one threshold for properties of at least one sound, where the at least one threshold includes a first threshold, and where the at least one sound includes a first sound received at a the a device; monitoring changes in properties of the first sound over time at the first device; detecting a first violation of the first threshold for the first sound; and providing a first notification based on the detection of the first violation.

In some aspects, the methods and systems include where the first sound is a voice of the first user, and where the first notification is an increase in a side tone gain at the first device. In some aspects, the methods and systems include where the first user sets the first threshold to be a first level of a volume of the voice of the first user. In some aspects, the methods and systems include where the first user sets a second threshold for the sound of the voice, where the second threshold is a second level of the volume of the voice of the first user, and further including, after providing the first notification, detecting a second violation of the second threshold and providing a second notification. In some aspects, the methods and systems include where the second notification includes at least one of a haptic alert and an audible alert at the first device. In some aspects, the methods and systems include where the first notification includes at least one of a haptic alert and an audible alert at the first device. In some aspects, the methods and systems include where the at least one sound further includes a second sound, where first sound is a voice of the first user and the second sound is a voice of the second user, and where the monitoring includes monitoring changes in properties of the first sound over time at the first device and changes in properties of the second sound over time at the first device. In some aspects, the methods and systems include where the at least one threshold further includes a second threshold, where the first threshold is a first level of a volume of the sounds, where the second threshold is a second level of the volume of the sounds, and where the detecting the first violation includes detecting at least one of the first threshold and the second threshold. In some aspects, the methods and systems include where the at least one threshold further includes a second threshold, where the first threshold is a time frame, and where the second threshold is a first level of a volume of the sounds. In some aspects, the methods and systems include where the time frame starts at a first detection of the second threshold, where the first violation includes detecting the second threshold a certain number of times within the time frame, and where if the certain number is not detected within the time frame, then the time frame starts over at an additional detection of the second threshold.

Additional embodiments include the use of a recording system or method to record the sounds. The recording can be automatic (e.g., triggered by the detection of a specified sound) and customizable. The recording can be an option configurable by a user, or configurable by an administrator.

Therefore, embodiments herein can advantageously monitor various sounds that are occurring and provide notifications of such sounds, as well as recordings of such sounds. These and other needs are addressed by the various aspects, embodiments, and/or configurations of the present disclosure.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "communication event" and its inflected forms includes: (i) a voice communication event, including but not limited to a voice telephone call or session, the event being in a voice media format, or (ii) a visual communication event, the event being in a video media format or an image-based media format, or (iii) a textual communication event, including but not limited to instant messaging, internet relay chat, e-mail, short-message-service, Usenet-like postings, etc., the event being in a text media format, or (iv) any combination of (i), (ii), and (iii).

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "database" is an organized collection of data held in a computer. The data is typically organized to model relevant aspects of reality (for example, the availability of specific types of inventory), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multivalue, semantic, and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented, and unstructured databases. "Database management systems" (DBMSs) are specially designed applications that interact with the user, other applications, and the database itself to capture and analyze data.

The terms "determine", "calculate" and "compute," and variations thereof, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

An "enterprise" refers to a business and/or governmental organization, such as a corporation, partnership, joint venture, agency, military branch, and the like.

A "geographic information system" (GIS) is a system to capture, store, manipulate, analyze, manage, and present all types of geographical data. A GIS can be thought of as a system—it digitally makes and "manipulates" spatial areas that may be jurisdictional, purpose, or application-oriented. In a general sense, GIS describes any information system that integrates, stores, edits, analyzes, shares, and displays geographic information for informing decision making.

The terms "instant message" and "instant messaging" refer to a form of real-time text communication between two or more people, typically based on typed text. Instant messaging can be a communication event.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running. Servers commonly operate within a client-server architecture, in which servers are computer programs running to serve the requests of other programs, namely the clients. The clients typically connect to the server through the network but may run on the same computer. In the context of Internet Protocol (IP) networking, a server is often a program that operates as a socket listener. An alternative model, the peer-to-peer networking module, enables all computers to act as either a server or client, as needed. Servers often provide essential services across a network, either to private users inside a large organization or to public users via the Internet.

The term "social network" refers to a web-based social network maintained by a social network service. A social network is an online community of people, who share interests and/or activities or who are interested in exploring the interests and activities of others.

The term "sound" or "sounds" as used herein refers to vibrations (changes in pressure) that travel through a gas, liquid, or solid at various frequencies. Sound(s) can be measured as differences in pressure over time and include frequencies that are audible and inaudible to humans and other animals. Sound(s) may also be referred to as frequencies herein.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements without departing from the spirit and scope of the disclosure.

Figure 1:
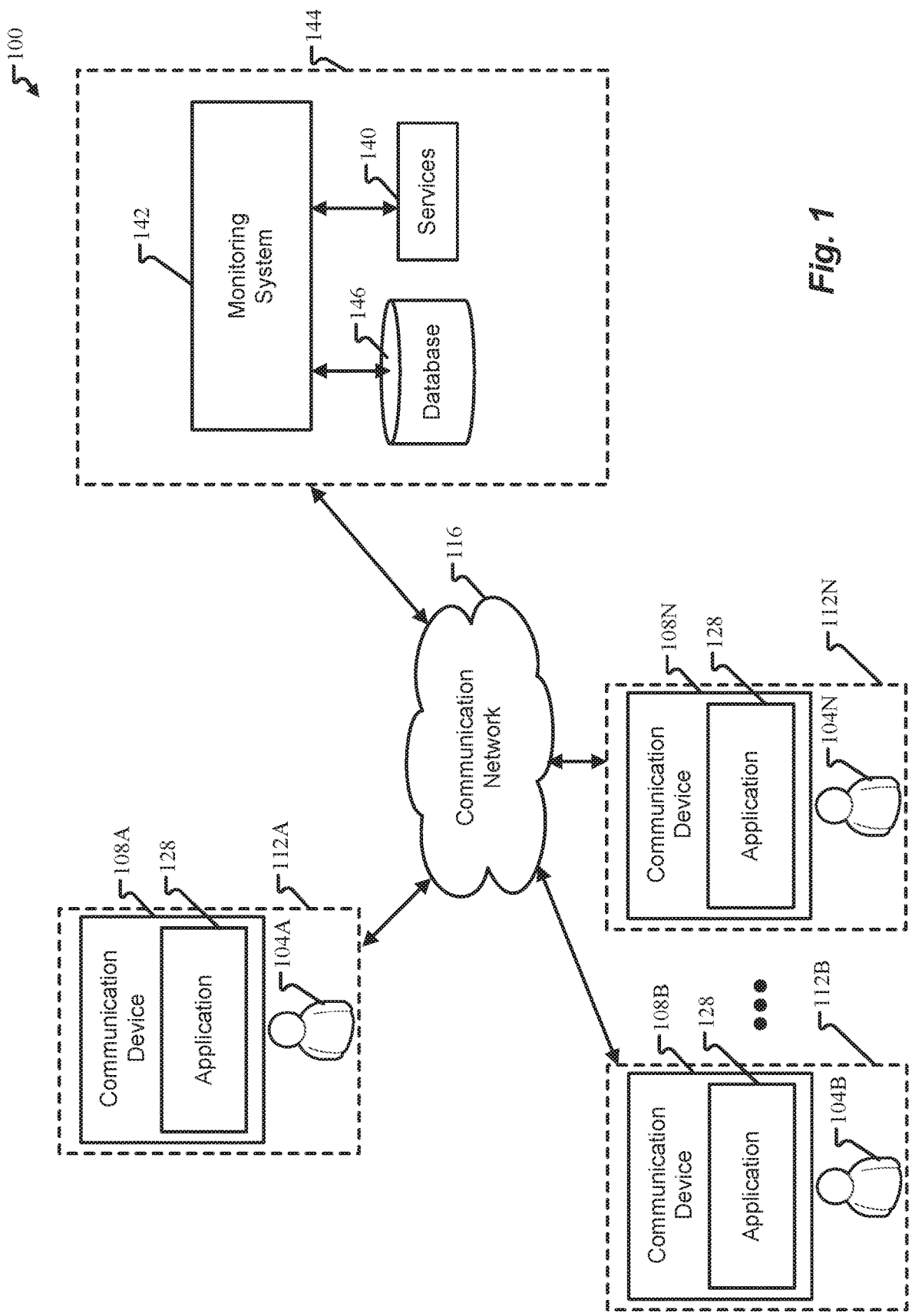
FIG. 1 illustrates a second block diagram of a system in accordance with embodiments of the present disclosure.

Referring to FIG. 1, a communication system 100 is illustrated in accordance with at least one embodiment of the present disclosure. The communication system 100 may allow a user 104A to participate in the communication system 100 using a communication device 108A while in a location 112A. As used herein, communication devices include user devices. Other users 104B to 104N also can participate in the communication system 100 using respective communication devices 108B through 108N at various locations 112B through 112N, which may be the same as, or different from, location 112A. Although each of the users 104A-N are depicted as being in respective locations 112A-N, any of the users 104A-N may be at locations other than the locations specified in FIG. 1. In accordance with embodiments of the present disclosure, one or more of the users 104A-N may access a monitoring system 142 utilizing the communication network 116.

The communication network 116 may be packet-switched and/or circuit-switched. An illustrative communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. The Internet is an example of the communication network 116 that constitutes an Internet Protocol (IP) network including many computers, computing networks, and other communication devices located all over the world, which are connected through many telephone systems and other means. In one configuration, the communication network 116 is a public network supporting the TCP/IP suite of protocols. Communications supported by the communication network 116 include real-time, near-real-time, and non-real-time communications. For instance, the communication network 116 may support voice, video, text, web-conferencing, or any combination of media. Moreover, the communication network 116 may comprise a number of different communication media such as coaxial cable, copper cable/wire, fiber-optic cable, antennas for transmitting/receiving wireless messages, and combinations thereof. In addition, it can be appreciated that the communication network 116 need not be limited to any one network type, and instead may be comprised of a number of different networks and/or network types. It should be appreciated that the communication network 116 may be distributed. Although embodiments of the present disclosure will refer to one communication network 116, it should be appreciated that the embodiments claimed herein are not so limited. For instance, more than one communication network 116 may be joined by combinations of servers and networks.

Although multiple user devices 108A-N are shown in FIG. 1, the methods and systems disclosed herein may be used with only one user device. The term "user device" as used herein is not limiting, and may be referred to as a communication device and mobile device, and variations thereof. A user device, as used herein, may include any type of device capable of communicating with one or more of another device and/or across a communications network, via a communications protocol, and the like. A user device may comprise any type of known communication equipment or collection of communication equipment. Examples of an illustrative user device may include, but are not limited to, any device with a sound and/or pressure receiver, a cellular phone, a smart phone, a telephone, handheld computers, laptops, netbooks, notebook computers, subnotebooks, tablet computers, scanners, portable gaming devices, pagers, GPS modules, portable music players, and other sound and/or pressure receiving devices. A user device does not have to be Internet-enabled and/or network-connected. In general, each user device may provide many capabilities to one or more users who desire to use or interact with the monitoring system 142. For example, a user may access a monitoring system 142 utilizing the communication network 116.

Capabilities enabling the disclosed systems and methods may be provided by one or more user devices through hardware or software installed on the user device, such as application 128. For example, the application 128 can monitor data received at the communication device by one or more sensors. The sensors can include a microphone or any other device that can detect changes in pressure over time or changes in a power level. The sensors may be located at any location, such as at any one or more communication devices, or at various physical locations. In certain aspects, the sensor or sensors are located in a position where they can receive the data being monitored.

In general, each user device 108A-N may provide many capabilities to one or more users 104A-N who desire to interact with the monitoring system 142. Although each user device 108A-N is depicted as being utilized by one user, one skilled in the art will appreciate that multiple users may share any single user device 108A-N.

In some embodiments, the monitoring system 142 may reside within a server 144. The server 144 may be a server that is administered by an enterprise associated with the administration of communication device(s) or owning communication device(s), or the server 144 may be an external server that can be administered by a third-party service, meaning that the entity which administers the external server is not the same entity that either owns or administers a user device. In some embodiments, an external server may be administered by the same enterprise that owns or administers a user device. As one particular example, a user device may be provided in an enterprise network and an external server may also be provided in the same enterprise network. As a possible implementation of this scenario, the external server may be configured as an adjunct to an enterprise firewall system, which may be contained in a gateway or Session Border Controller (SBC) which connects the enterprise network to a larger unsecured and untrusted communication network. An example of a messaging server is a unified messaging server that consolidates and manages multiple types, forms, or modalities of messages, such as voice mail, email, short-message-service text message, instant message, video call, and the like.

Although various modules and data structures for disclosed methods and systems are depicted as residing on the server 144, one skilled in the art can appreciate that one, some, or all of the depicted components of the server 144 may be provided by other software or hardware components. For example, one, some, or all of the depicted components of the server 144 may be provided by logic on a communication device (e.g., the communication device may include logic for the methods and systems disclosed herein so that the methods and systems are performed locally at the communication device). Further, the logic of application 128 can be provided on the server 144 (e.g., the server 144 may include logic for the methods and systems disclosed herein so that the methods and systems are performed at the server 144). In embodiments, the server 144 can perform the methods disclosed herein without use of logic on any user devices 108A-N.

The monitoring system 142 implements functionality for the methods and systems described herein by interacting with one or more of the user devices 108A-N, application 128, database 146, and services 140, and/or other sources of information not shown. In various embodiments, settings (including alerts and thresholds) may be configured and changed by any users and/or administrators of the system 100. Settings may be configured to be personalized in any manner (e.g., for a device or user), and may be referred to as profile settings.

The database 146 may include information pertaining to one or more of the users 104A-N, user devices 108A-N, and monitoring system 142, among other information. For example, the database 146 can include settings for notifying users of sounds that are detected, including settings related to alerts, thresholds, user devices, users, and applications.

The services module 140 may allow access to information in the database 146 and may collect information from other sources for use by the monitoring system 142. In some instances, data in the database 146 may be accessed utilizing one or more service modules 140 and an application 128 running on one or more user devices, such as user devices 108A-N, at any location, such as locations 112A-N. Although FIG. 1 depicts a single database 146 and a single service module 140, it should be appreciated that one or more servers 144 may include one or more services module 140 and one or more databases 146.

Application 128 may be executed by one or more user devices (e.g., user devices 108A-N) and may execute all or part of monitoring system 142 at one or more of the user device(s) 108A-N by accessing data in database 146 using service module 140. Accordingly, a user may utilize the application 128 to access and/or provide data to the database 146. For example, a user 104A may utilize application 128 executing on user device 108A to invoke alert settings using thresholds of one or more properties that the user 104A wishes to receive an alert for if the properties exceeding certain thresholds are detected at the user device 108A. Such data may be received at the monitoring system 142 and associated with one or more profiles associated with the user 104A and stored in database 146. Alternatively, or in addition, the monitoring system 142 may receive an indication that other settings associated with various criteria should be applied in specified circumstances. For example, settings may be associated with a particular location (e.g., location 112A) so that the settings are applied to user 104A's communication device 108A based on the location (e.g., from an enterprise associated with user 104A). Thus, data associated with a profile of user 104A and/or a profile of location 112A may be stored in the database 146 and used by application 128.

As shown in FIG. 1, if users 112B-N are located physically close to each other (e.g., in a shared workspace), there is a possibility that the noise from one of the users may disturb the other users. For example, user 112B may be on the phone and user 112B may increase the volume of his voice during the conversation to such a level that it is distracting to users 112C-N. The volume of user 112B's voice may even disturb others that are outside of the shared workspace; for example, if user 112A is in an adjacent room or down the hall, the volume of user 112B's voice may carry to the adjacent room or hall and disturb user 112A. However, user 112B may not be aware of that the volume of his voice is bothering others (e.g., because the volume increased slowly over time, or because the volume of his voice may be increasing and decreasing over time). Thus, a system and method for notifying user 112B of the volume of their voice, if the volume reaches an undesirable level, would be useful. Such a scenario may be useful for other properties of a user's voice, and even for other sounds that a user may be occurring. Methods and systems disclosed herein advantageously provide alerts to a user when a sound is undesirable.

Figure 2:
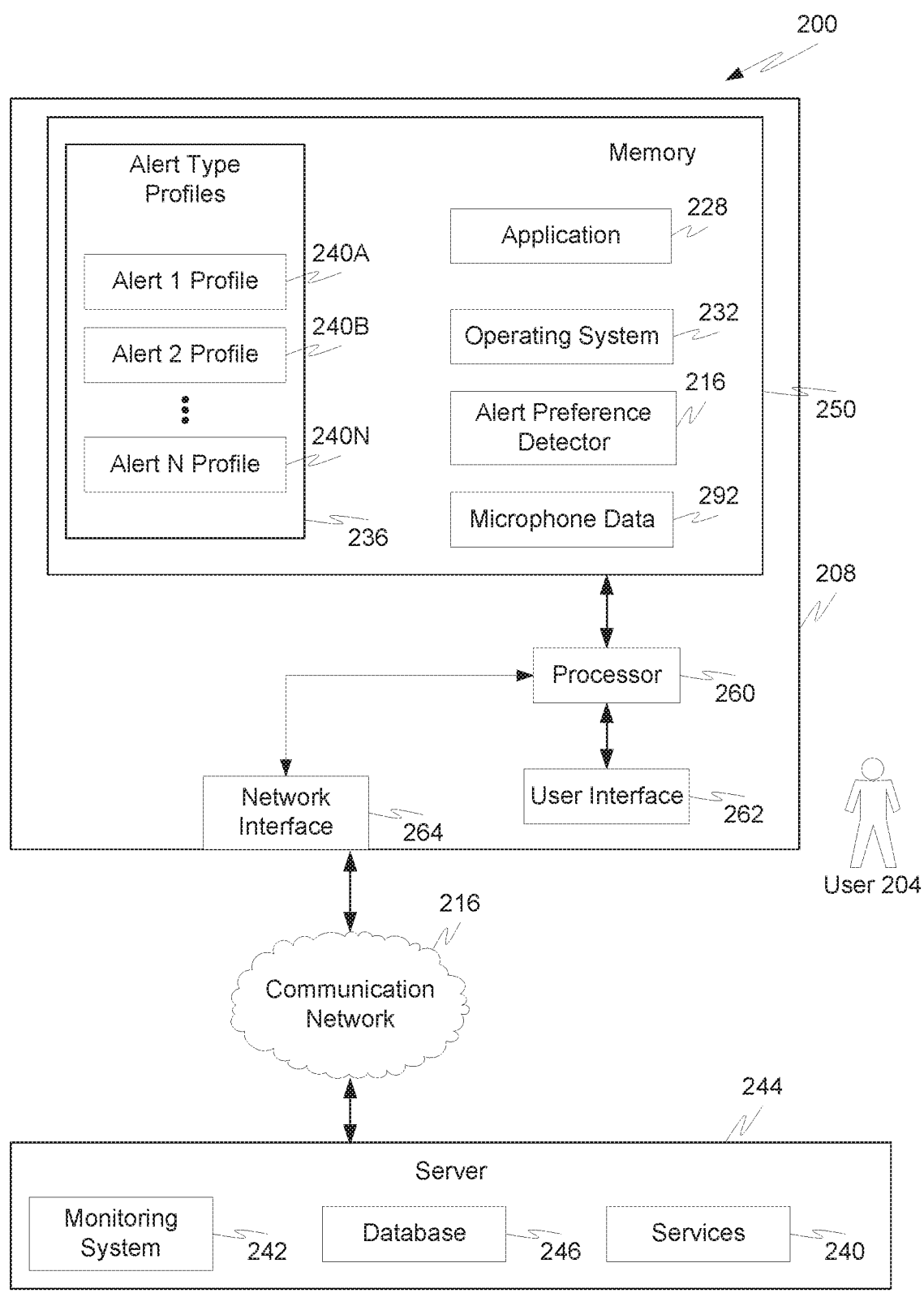
FIG. 2 illustrates a second block diagram of a system in accordance with embodiments of the present disclosure.

Referring to FIG. 2, a communication system 200 is illustrated in accordance with at least one embodiment of the present disclosure. The communication system 200 may allow a user 204 to participate in the communication system 200 using a user device 208. The depicted user device 208 includes a processor 260, memory 250, a user interface 262, and a network interface 264. The memory 250 includes application 228 and operating system 232, as well as alert type profiles 236 (including alert 1 profile 240A through alert N profile 240N), alert preference detector 216, and microphone data 292.

The user 204 may interact with other users (not shown) using user device 208, which may be configured to interact with other user devices (not shown) via a communication network 216. However, it is not necessary for the user device 208 to interact with other user devices or a communication network. User 204 and other users (and user device 208 and other user devices) may be in any location and using and/or sharing any type of user device. Although the details of only one illustrative user device 208 is depicted in FIG. 2, one skilled in the art will appreciate that other user devices may be equipped with different or identical components as the user device 208 depicted in FIG. 2. Also, the user device 208 may be configured to interact with a server 244 via the communication network 216.

The monitoring system 242 implements functionality for the methods and systems described herein by interacting with a user device 208 (including its hardware and software components), database 246, and services 240, and/or other sources of information not shown (e.g., data from other servers or databases). In various embodiments, settings (including alerts and thresholds) may be configured and changed by any users and/or administrators of the system 200. Settings may be configured to be personalized for a device or user, and may also be referred to herein as alerts, alarms, thresholds, alert settings, threshold settings, and profile settings.

The database 246 may include information pertaining to one or more users (e.g., user 204) and/or one or more user devices (e.g., user device 208), and monitoring system 242, among other information. For example, the database 246 can include settings related to the methods and systems disclosed herein, including settings related to alerts, thresholds, locations, user devices, users, and applications.

The services module 240 may allow access to information in the database 246 and may collect information from other sources for use by the monitoring system 242. In some instances, data in the database 246 may be accessed utilizing one or more service modules 240 and an application 228 running on one or more user devices, such as user device 208. Although FIG. 2 depicts a single database 246 and a single services module 240, it should be appreciated that one or more servers 244 may include one or more services module 240 and one or more databases 246. The services module(s) and database(s) may be located at any remote location (e.g., a server) or on any local device (e.g., a user device), and may include any type of database or other storage system. Thus, the database can be a flat file data system, an object-oriented data system, or some other data system.

Application 228 may be executed by one or more user devices (e.g., user device 208) and may execute all or part of monitoring system 242 at the user device 208 by accessing data in database 246 using services module 240 via communication network 216. Accordingly, a user may utilize the application 228 to access and/or provide data to the database 246. For example, a user 204 may utilize application 228 executing on user device 208 to invoke alert settings using alert type profiles 236, which define what thresholds (e.g., levels or limits) of properties that the user 204 wishes to receive an alert for if one or more of the properties exceeding such thresholds are detected by the monitoring system 242. For example, sound data may be received at the monitoring system 242 (e.g., via a microphone of the device 208 and the microphone data 292) and associated with one or more profiles 236 associated with the user 204 and stored in database 246. Thus, data associated with a profile 236 of user 204 and/or a user device 208 may be stored in the database 246 and used by application 228.

Notification settings (e.g., notifications that are provided based on the alert type profiles 236) may be set based on any criteria. In some aspects, different types of thresholds may be used to configure notifications. For example, the thresholds may correspond to one or more specified volumes or frequencies of sound, timeframes, or a detection of a specified range of volumes or frequencies occurring over one or more timeframes. In embodiments described herein, notification settings can also include settings for recordings and the recordings may be automatically implemented based upon one or more thresholds. Settings, including data regarding thresholds, notifications, and recordings, may be stored at any location. The settings may be predetermined (e.g., automatically applied upon use of the application 228) and/or set or changed based on various criteria. The settings are configurable for any timing or in real-time (e.g., the monitoring may occur at any timing or continuously in real-time).

Settings can include customized settings for any user, device, or groups of users or devices, for example. For example, users may each have profile settings that configure their thresholds and notifications, among other user preferences. In various embodiments, settings configured by a user may be referred to as user preferences, alarm preferences, and user profile settings. Settings chosen by an administrator or any other specified user or users may override other settings that have been set by other users, or settings that are set to be default to a device, user, or location, or any other settings that are in place. Alternatively, settings chosen by a receiving user may be altered or ignored based on any criteria at any point in the process. For example, settings may be created or altered based on a user's association with a position, a membership, or a group, based on a location or time of day, or based on a user's identity or group membership, among others.

The settings of the application 228 can cause a notification to be displayed at communication device 208 when a sound outside of a specified range (e.g., a volume range or frequency range) or threshold is detected. For example, volumes used by the settings may be set based on a specific volume, or a volume range(s), and frequencies used by the settings may be set based on a specific frequency, or a frequency range(s). Upper or lower limits on a volume (or frequency) or range(s) of volumes (or frequencies) may be referred to as thresholds herein. One or more volumes (also referred to herein as a level of volume) may be configured to have a notification sent to a user (via one or more devices) when the volume is detected (e.g., via the alert types profiles 236), and the alert type profiles 236 may be set to be the same or different for one or more locations, one or more devices, and/or one or more users, for example. Thus, one or more thresholds may be set; for example, thresholds related to any user, user device, etc. In addition, application 228 may automatically configure one or more user devices 208 with thresholds and/or notifications. The thresholds and/or notifications may vary based on a user's preferences (including preferences regarding specific devices), properties associated with a user (including properties associated with a user's voice), properties associated with devices, locations associated with devices or users, and groups that a user is a member of, among others. In various embodiments, one or more thresholds and/or notifications may be set based upon user or administrative preferences.

As an illustrative example, a user may set a first and second threshold in an alert 1 profile 240A and an alert 2 profile 240B, where each threshold is a different level of the user 204's voice as measured by a power level of a microphone (not shown in FIG. 2) on the device 208 (with data collected in the microphone data 292). The alert 1 profile 240A has a threshold of 75 decibels. The alert 1 profile 240A does not have any timeframe associated with it, but has a higher threshold for the volume of the voice than the alert 2 profile 240B. If the threshold of 75 decibels is detected by the monitoring system 242, then the notification associated with the alert 1 profile 240A will occur (e.g., two short beeps and a two second vibration of the device). The alert 2 profile 240B has a threshold of 70 decibels. The alert 2 profile 240B has a timeframe associated with it so that if the user 204 speaks at the threshold of 70 decibels in excess of two minutes (as a cumulative amount of time during the conversation), then the notification associated with the alert 2 profile 240B will sound (e.g., one short beep). Once the cumulative amount of time set in the alert 2 profile 240B occurs and the notification sounds, then the timeframe resets so that the alert 2 profile 240B begins monitoring and adding times of any sounds in excess of 70 decibels again to obtain another cumulative amount. The numbers provided herein are illustrative and not limiting.

Upon having these settings enacted (e.g., as an update to the settings while the monitoring system 242 is running, or prior to starting the monitoring system 242), the monitoring system 242 monitors sounds received at the device 208. During a conversation, the user 204 may become excited and a level of the volume of their voice rises. Each time the user 204's voice rises above 75 decibels, the user device 208 provides the notification per the settings (e.g., sounds two short beeps and vibrates per the alert 1 profile 240A settings). Whenever the user 204's voice reaches 70 decibels, the monitoring system 242 times the amount of time that the user 204's voice is at or above 70 decibels and adds those times together (e.g., monitoring an amount of time or a timeframe). Once the cumulative amount of time that the user 204's voice is at or above 70 decibels exceeds the timeframe of two minutes, then the notification associated with the alert 2 profile 240B occurs at device 208 (e.g., one short beep). The monitoring system 242 may be configured to enact the alert type profiles 236 in any manner; for example, at the beginning of any communication session (e.g., any timeframes or monitoring would not start until user 204 is engaged in a communication session using device 208), or by continuously monitoring sounds.

The alert type profiles 236, including settings and notifications, may be configured in any manner, including for monitoring and notifying at any one or more devices and at using any timing, including having notifications being sent at varying times, repetitively, or simultaneously. The monitoring system 242 may automatically start or stop monitoring based on any criteria (e.g., selection by the user or an administrator, connections made by the device 208, detections of specific locations of device 208, etc.) Thus, the methods and systems described herein can monitor sounds and enact various notifications based on the sounds detected.

Audible alerts can include any type of audible indication of the notification that may be any type of sound and any volume of sound. Visual alerts can include a visual indication of the notification, such as words on the device, a symbol appearing on the device, a flashing or solid lit LED, etc. Haptic alerts can include any type of haptic indication of the notification, such as a vibration of a device.

The user interface 262 may include one or more user input and/or one or more user output device. The user interface 262 can enable a user or multiple users to interact with the user device 208. Exemplary user input devices which may be included in the user interface 262 comprise, without limitation, a microphone, a button, a mouse, trackball, rollerball, or any other known type of user input device. Exemplary user output devices which may be included in the user interface 262 comprise, without limitation, a speaker, light, Light Emitting Diode (LED), display screen, buzzer, or any other known type of user output device. In some embodiments, the user interface 262 includes a combined user input and user output device, such as a touch-screen.

The processor 260 may include a microprocessor, Central Processing Unit (CPU), a collection of processing units capable of performing serial or parallel data processing functions, and the like.

The memory 250 may include a number of applications or executable instructions that are readable and executable by the processor 260. For example, the memory 250 may include instructions in the form of one or more modules and/or applications. The memory 250 may also include data and rules in the form of one or more settings for thresholds and/or alerts that can be used by one or more of the modules and/or applications described herein. Exemplary applications include an operating system 232 and application 228.

The operating system 232 is a high-level application which enables the various other applications and modules to interface with the hardware components (e.g., processor 260, network interface 264, and user interface 262) of the user device 208. The operating system 232 also enables a user or users of the user device 208 to view and access applications and modules in memory 250 as well as any data, including settings.

The application 228 may enable other applications and modules to interface with hardware components of the user device 208. Exemplary features offered by the application 228 include, without limitation, monitoring features (e.g., sound monitoring from microphone data acquired locally or remotely such as microphone data 292), notification/alerting features (e.g., the ability to configures settings and manage various audio, visual, and/or haptic notifications), recording features (e.g., voice communication applications, text communication applications, video communication applications, multimedia communication applications, etc.), and so on. In some embodiments, the application 228 includes the ability to facilitate real-time monitoring and/or notifications across the communication network 216.

Application 228 may be executed by one or more communication devices (e.g., communication devices 208) and may execute all or part of monitoring system 242 at one or more of the communication device(s) by accessing data in database 246 using service module 240. Accordingly, a user may utilize the application 228 to access and/or provide data to the database 246. For example, a user 204 may utilize application 228 executing on communication device 208 to invoke alert settings using thresholds of sound properties that the user 204 wishes to receive an alert for if properties exceeding such thresholds are detected at the communication device 208. Such data may be received at the monitoring system 242 and associated with one or more profiles associated with the user 204 and stored in database 246.

Alternatively, or in addition, the monitoring system 242 may receive an indication that other settings associated with various criteria should be applied in specified circumstances. For example, settings may be associated with a particular location (e.g., location 112A) so that the settings are applied to user 204's communication device 208 based on the location (e.g., from an enterprise associated with location 112A). Thus, data associated with a profile of user 204 and/or a profile of location 112A may be stored in the database 246 and used by application 228.

The memory 250 may also include a monitoring system or module, instead of or in addition to one or more applications 228, which provides some or all functionality of the sound monitoring and alerting as described herein, and the monitoring system can interact with other components to perform the functinality of the monitoring and alerting, as described herein. In particular, the monitoring module may contain the functionality necessary to enable the user device 208 to monitor sounds and provide notifications without use of any server or network connection.

Although some applications and modules are depicted as software instructions residing in memory 250 and those instructions are executable by the processor 260, one skilled in the art will appreciate that the applications and modules may be implemented partially or totally as hardware or firmware. For example, an Application Specific Integrated Circuit (ASIC) may be utilized to implement some or all of the functionality discussed herein.

Although various modules and data structures for disclosed methods and systems are depicted as residing on the user device 208, one skilled in the art can appreciate that one, some, or all of the depicted components of the user device 208 may be provided by other software or hardware components. For example, one, some, or all of the depicted components of the user device 208 may be provided by a monitoring system 242 which is operating on a server 244, as shown in FIG. 2. Further, the logic of server 244 can be provided on user device 208 (e.g., one or more of the user device(s) may include logic for the methods and systems disclosed herein so that the methods and systems are performed at the user device(s)). In embodiments, the user device 208 can perform the methods disclosed herein without use of logic on the server 244.

The memory 250 may also include one or more communication applications and/or modules, which provide communication functionality of the user device 208. In particular, the communication application(s) and/or module(s) may contain the functionality necessary to enable the user device 208 to communicate with other user devices (not shown) across the communication network 216. As such, the communication application(s) and/or module(s) may have the ability to access communication preferences and other settings, maintained within a locally-stored or remotely-stored profile (e.g., one or more profiles maintained in database 246 and/or memory 250), format communication packets for transmission via the network interface 264, as well as condition communication packets received at a network interface 264 for further processing by the processor 260. For example, locally-stored communication preferences may be stored at a user device 208. Remotely-stored communication preferences may be stored at a server, such as server 244. Communication preferences may include settings information and alert information, among other preferences.

The network interface 264 comprises components for connecting the user device 208 to communication network 216. In some embodiments, a single network interface 264 connects the user device to multiple networks. In some embodiments, a single network interface 264 connects the user device 208 to one network and an alternative network interface is provided to connect the user device 208 to another network. The network interface 264 may comprise a communication modem, a communication port, or any other type of device adapted to condition packets for transmission across a communication network 216 to one or more destination user devices (not shown), as well as condition received packets for processing by the processor 260. Examples of network interfaces include, without limitation, a network interface card, a wireless transceiver, a modem, a wired telephony port, a serial or parallel data port, a radio frequency broadcast transceiver, a USB port, or other wired or wireless communication network interfaces.

The type of network interface 264 utilized may vary according to the type of network which the user device 208 is connected, if at all. Exemplary communication networks 216 to which the user device 208 may connect via the network interface 264 include any type and any number of communication mediums and devices which are capable of supporting communication events (also referred to as "phone calls," "messages," "communications" and "communication sessions" herein), such as voice calls, video calls, chats, emails, TTY calls, multimedia sessions, or the like. In situations where the communication network 216 is composed of multiple networks, each of the multiple networks may be provided and maintained by different network service providers. Alternatively, two or more of the multiple networks in the communication network 216 may be provided and maintained by a common network service provider or a common enterprise in the case of a distributed enterprise network.

Although various modules and data structures for disclosed methods and systems are depicted as residing on the server 244, one skilled in the art can appreciate that one, some, or all of the depicted components of the server 244 may be provided by other software or hardware components. For example, one, some, or all of the depicted components of the server 244 may be provided by logic on a communication device (e.g., the communication device may include logic for the methods and systems disclosed herein so that the methods and systems are performed locally at the communication device). Further, the logic of application 228 can be provided on the server 244 (e.g., the server 244 may include logic for the methods and systems disclosed herein so that the methods and systems are performed at the server 244). In embodiments, the server 244 can perform the methods disclosed herein without use of logic on any communication devices 208.

For example, the monitoring system 242 can optionally interact with a presence server (not shown) that is a network service which accepts, stores and distributes presence information. Presence information is a status indicator that conveys an ability and willingness of a user to communicate. User devices can provide presence information (e.g., presence state) via a network connection to a presence server, which can be stored in what constitutes a personal availability record (e.g., a presentity) and can be published and/or made available for distribution. Use of a presence server may be advantageous, for example, if the user is at a location where it is desired to avoid sounds having certain properties, such as sounds that are too loud (e.g., the user may be in a work location that is a shared work environment, the user may be in a library, a school, etc.). In such a circumstance, the monitoring system 242 may automatically enact the methods and systems described herein using alert type profiles 236 that are set for the detected location. In addition, settings of the monitoring system 242 may be customizable based on an indication of availability information and/or location information for one or more users.

Data used or generated by the methods and systems described herein may be stored at any location. In some embodiments, data (including settings) may be stored by an enterprise and pushed to the user device 208 on an as-needed basis. The remote storage of the data may occur on another user device or on a server. In some embodiments, a portion of the data are stored locally on the user device 208 and another portion of the data are stored at an enterprise and provided on an as-needed basis.

In various embodiments, microphone data 292 may be received and stored at the server. Although FIG. 2 shows microphone data 292 stored on the server 244, the microphone data 292 may be stored in other locations, such as directly on a user device. The microphone data 292 can include sound data received from various sources, such as from one or more user devices 208, from other devices able to monitor (e.g., detect and analyze) sounds, and from other servers, for example. In various embodiments, microphone data 292 is sound received and monitored (e.g., processed) in real-time so that data storage requirements are minimal. The microphone data 292 may correspond to a power level of one or more sound receiving devices.

In certain aspects of the present disclosure, the monitoring system 242 monitors microphone data 292 to determine if notifications should be sent to any of the user devices 208. For example, the microphone data 292 may be received from user device 208 and the monitoring system 242 may determine that a frequency within the microphone data 292 is outside of a threshold set by the system. The monitoring system 242 may process the microphone data 292 using the settings stored in database 246 (e.g., settings associated with alert type profiles 236). After determining that the threshold has been exceeded, the monitoring system 242 can send a notification to display on user device 208 via communication network 216, network interface 264, application 228, processor 260, and user interface 262.

As can be appreciated by one skilled in the art, functions offered by the elements depicted in FIG. 2 may be implemented in one or more network devices (i.e., servers, networked user device, non-networked user device, etc.).

Figure 3:
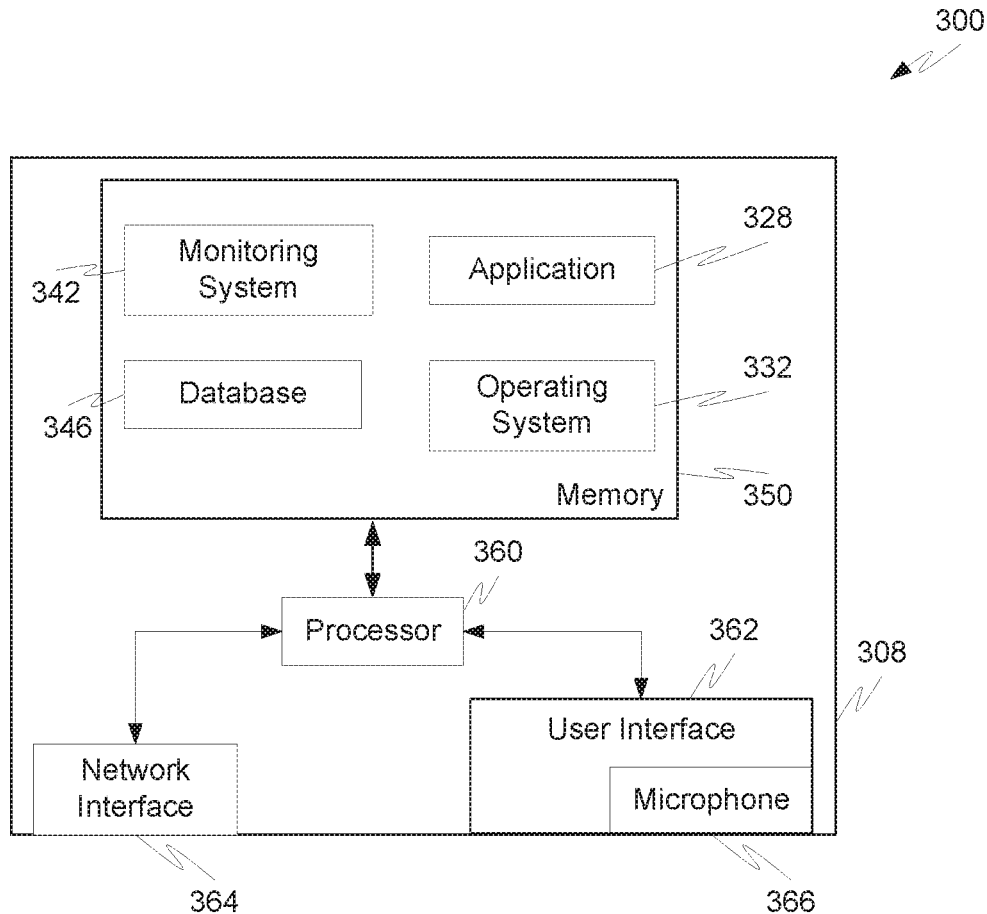
FIG. 3 illustrates a third block diagram of a system in accordance with embodiments of the present disclosure.

A system 300 including a user device 308 capable of allowing a user to interact with a monitoring system 342 is shown in FIG. 3. The depicted user device 308 includes a processor 360, memory 350, a user interface 362, a network interface 364, and a microphone 366. The memory 350 includes a monitoring system 342, a database 346, an application 328, and an operating system 332. Although the details of only one user device 308 are depicted in FIG. 3, one skilled in the art will appreciate that one or more other user devices may be equipped with similar or identical components as the user device 308 depicted in detail. Components shown in FIG. 3 may correspond to those shown and described in FIGS. 1 and 2.

The user interface 362 can enable a user or multiple users to interact with the user device 308A and includes microphone 366. Exemplary user input devices which may be included in the user interface 362 comprise, without limitation, a button, a mouse, trackball, rollerball, image capturing device, or any other known type of user input device. Exemplary user output devices which may be included in the user interface 362 comprise, without limitation, a speaker, light, Light Emitting Diode (LED), display screen, buzzer, or any other known type of user output device. In some embodiments, the user interface 362 includes a combined user input and user output device, such as a touch-screen. Using user interface 362, a user may configure settings via the application 328 for thresholds and notifications of the monitoring system 342.

The processor 360 may include a microprocessor, Central Processing Unit (CPU), a collection of processing units capable of performing serial or parallel data processing functions, and the like. The processor 360 interacts with the memory 350, user interface 362, and network interface 364, and may perform various functions of the application 328 and monitoring system 342.

The memory 350 may include a number of applications or executable instructions that are readable and executable by the processor 360. For example, the memory 350 may include instructions in the form of one or more modules and/or applications. The memory 250 may also include data and rules in the form of one or more settings for thresholds and/or alerts that can be used by the application 328, the monitoring system 342, and the processor 360.

The operating system 332 is a high-level application which enables the various other applications and modules to interface with the hardware components (e.g., processor 360, network interface 364, and user interface 362, including microphone 366) of the user device 308. The operating system 332 also enables a user or users (not shown in FIG. 3) of the user device 308 to view and access applications and modules in memory 350 as well as any data, including settings. In addition, the application 328 may enable other applications and modules to interface with hardware components of the user device 308.

The memory 350 may also include a monitoring system 342, instead of or in addition to one or more applications, including application 328. The monitoring system 342 and the application 328 provide some or all functionality of the monitoring and notifying as described herein, and the monitoring system 342 and application 328 can interact with other components to perform the functinality of the monitoring and notifying, as described herein. In particular, the monitoring system 342 may contain the functionality necessary to enable the user device 308 to monitor sounds and provide notifications.

Although some applications and modules are depicted as software instructions residing in memory 350 and those instructions are executable by the processor 360, one skilled in the art will appreciate that the applications and modules may be implemented partially or totally as hardware or firmware. For example, an Application Specific Integrated Circuit (ASIC) may be utilized to implement some or all of the functionality discussed herein.

Although various modules and data structures for disclosed methods and systems are depicted as residing on the user device 308, one skilled in the art can appreciate that one, some, or all of the depicted components of the user device 308 may be provided by other software or hardware components. For example, one, some, or all of the depicted components of the user device 308 may be provided by systems operating on a server. In the illustrative embodiments shown in FIG. 3, the user device 308 includes all the necessary logic for the methods and systems disclosed herein so that the methods and systems are performed at the user device 308. Thus, the user device 308 can perform the methods disclosed herein without use of logic on a server.

In various embodiments, the user device 308 monitors sounds by receiving sounds in real-time thorugh the microphone 366. The processor 360 monitors the sounds received by microphone 366 by measuring the frequencies of the sounds received and comparing the frequencies to thresholds stored in memory 350 and maintained by the monitoring system 342. If the processor 360 determines that a frequency received from the microphone 366 exceeds a threshold, the monitoring system 342 provides an alert at the user device 308, e.g., via the application 328 and the user interface 362.

Figure 4:
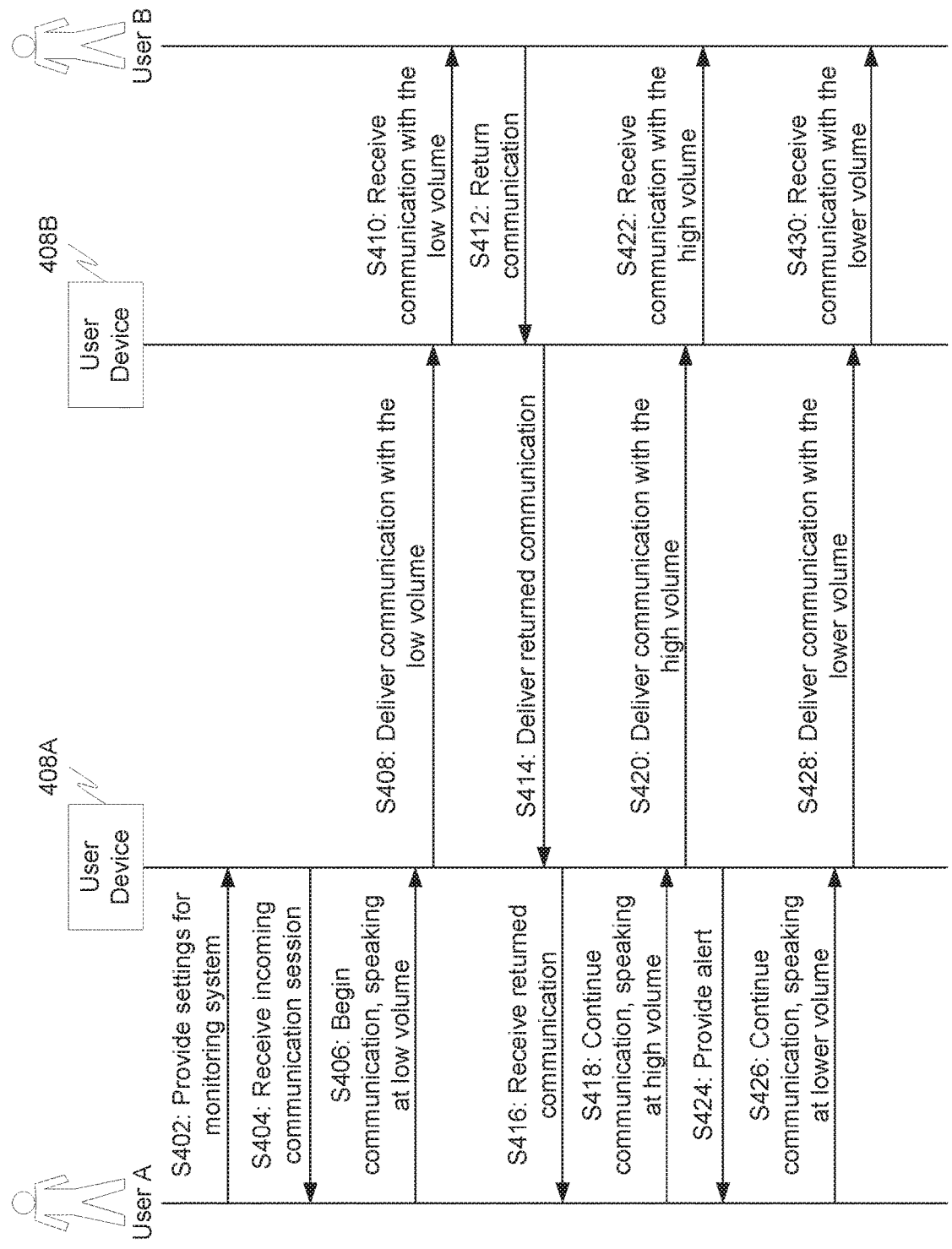
FIG. 4 illustrates a block diagram of a server in accordance with embodiments of the present disclosure.

With reference now to FIG. 4, an exemplary logic flow chart will be described in accordance with at least some embodiments of the present invention. Components shown in FIG. 4 may correspond to those shown and described in FIGS. 1, 2, and 3. The description of FIG. 4 below sometimes refers to various components of FIGS. 1, 2, and 3, by way of example and the description is not limiting.

The method is initiated when a communication session is initiated or about to be initiated between two or more user devices 408A and 408B and a user A provides settings for the monitoring system to user device 408A at step 402. Providing the settings may involve one or more of enabling the monitoring system, setting and/or updating alert type profiles, opting in to settings that are automatically provided, etc. Before, during, or after the settings are provided at step 402, the monitoring system can begin monitoring the sounds at device 408A (for example, by receiving sounds (e.g., voice input) from user A from a microphone during a communication).

In step 404, user A receives an incoming communication session via user device 408A where the incoming communication session is a request to connect user device 408A with user device 408A in a voice conversation (e.g., a phone call). In step 406, user A accepts the request for connection and begins the communication, with user A speaking at a low volume of voice into user device 408A. Using a communication network (e.g., communication network 116 shown in FIG. 1), the user device 408A delivers the communication with the low volume of the voice of the user A to the user device 408B.

User B receives the communication with the low volume of the voice of user A from user device 408B at step 410, and in step 412 user B returns the communication by speaking into user device 408B. In step 414, user device 408B delivers the returned communication to user device 408A and in step 416, user A receives the returned communication from user device 408A.

Upon receiving the returned communication in step 416, user A becomes excited and starts to raise the volume of their voice so that in step 418, user A continues the communication but is speaking at a high volume into user device 408A. During steps 402-418, the monitoring system has been monitoring sounds from user A according to the settings set in step 402. In step 420, the user device 408A delivers the communication with the high volume of the user A's' voice to user device 408B (which the user B receives in step 422) while the user device 408A provides an alert to user A in step 424. Although steps 420 and 422 are shown in FIG. 4 as occurring prior to step 424, the monitoring system at user device 408A may provide the alert in step 424 to user A prior to one or both of steps 420 and 422. At step 424, user A receives the alert provided by user device 408A.

Based on the alert provided in step 424, user A realizes that their voice was at too high of a volume during the communication in step 418 (e.g. at a volume above a threshold set by the settings of step 402), and the user A adjusts the volume of their voice to lower the volume in the communication in step 426. In step 428, the user device 408A delivers the communication with the lower volume of voice from user A to user device 408B and in step 430 user B receives the communication with the lower volume at user device 408B. Thus, advantageously, user A has corrected the volume of their voice to be lower during the conversation. In various embodiments, the threshold set for an alert to occur (e.g., at the level of volume associated with steps 418 and 424) may be at a lower level than when a user is considered to be so loud that they are offensive or upsetting to the other user (e.g., user B). Therefore, a user (e.g., user A) may advantageously correct the volume of their voice prior to offending or upsetting another person (e.g. user B). Also, a user may make such a correction without other people being aware that the user is making a correction. This may be advantageous in various types of interpersonal relationships, in business relationships, for conversations happening between people of different cultures (where one culture speaks in a lower or monotone type of voice and another participant in the communication speaks in a loud and varied level of voice), and in other various scenarios. This may also be useful if a person is attempting to learn or perfect a language where properties of a voice are important to becoming fluent, so that the learner of the language can monitor themselves as they speak and be provided with customized notifications that monitor one or more properties of their sounds as they speak.

Figure 5:
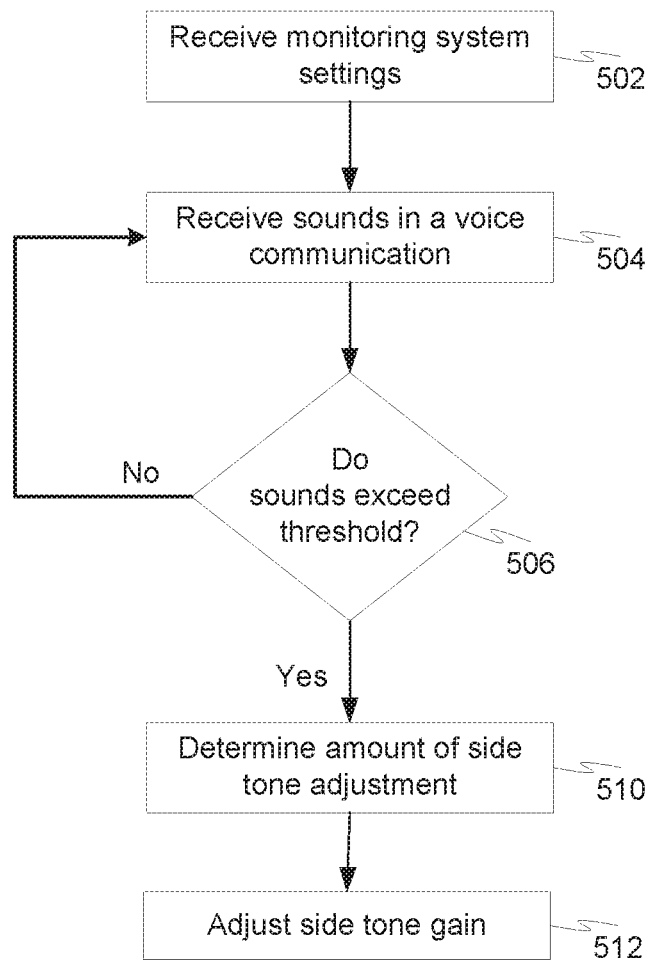
FIG. 5 is a first logic flow chart according to embodiments of the present disclosure.

With reference now to FIG. 5, an exemplary logic flow chart will be described in accordance with at least some embodiments of the present invention. Steps shown in FIG. 5 (and components implementing the steps) may correspond to those shown and described in FIGS. 1-4. The description of FIG. 5 below sometimes refers to various components of FIGS. 1-4, by way of example, and the description is not limiting.

The method is initiated when monitoring system settings are received in step 502. Then, sounds in a voice communication are received in step 504. The sounds may be received at a device that is adjacent to a user making the sounds, for example by a microphone of the device that is receiving the user's voice. The received sounds are monitored by the monitoring system, and as discussed herein, the monitoring may be done at one or more devices (using a microphone or other method of detecting sound frequencies) and at any location. The monitoring may be continuous, in response to a user input at a device (e.g., an input from a user or administrator at step 502), and/or based on any criteria such as a known occupancy at the location. During the monitoring, incoming sounds are received and processed (e.g., compared to thresholds of acceptable volumes or other properties). Thresholds may be set based on any criteria, and multiple thresholds may be set with different actions taken at different thresholds, or the same actions taken at different thresholds.

The method continues with determining whether the sounds that were received exceeded a threshold in step 506. The threshold may have been set when the monitoring system settings were received in step 502. If the sounds do not exceed the threshold, the method returns to step 504 where the sounds continue to be received. If the sounds do exceed the threshold, the method continues to step 510 where an amount of side tone gain to be adjusted is determined.

The amount of side tone gain to be adjusted may be a single set amount, or it may depend on the threshold that is exceeded. For example, if the threshold is exceeded in step 506, the side tone gain may be determined to be adjusted upwards (in step 510) by a certain amount (e.g., 10%) for a set amount of time (e.g., the following 3 seconds that the user is speaking). After the side tone gain is adjusted in step 512, this may advantageously cause the user to automatically lower the volume of their voice when they hear the increased side tone gain (e.g., they hear an increased amount of their voice played back to them by the speaker of the device as they are speaking).

However, the side tone may be adjusted in any manner and is not limited by this description. For example, there may be multiple thresholds that are set in the settings at step 502, with each threshold being related to a different amount of side tone gain. Thus, if the volume of the user's voice exceeds a first threshold (e.g., 68 decibels), then a first amount of side tone gain may be determined to be adjusted (e.g., adjust the side tone gain upwards by 5%), and if the volume of the user's voice exceeds a second threshold (e.g., 73 decibels), then a second amount of side tone gain may be determined to be adjusted (e.g., adjust the side tone gain upwards by 10%). Thus, an amount of the side tone gain adjustment may advantageously correspond to an amount of increased volume spoken by the user. In addition, a time frame for a length of time for the side tone gain to be adjusted is variable and may be set to be any configuration.

Thus, for a user device into which the user is speaking, increasing the sidetone gain would cause the user to hear their own voice (e.g., picked up from the microphone of the user device) to be played back (e.g., via speakers of the device) in their own ear. This can be advantageous because the natural human response to hearing themselves louder is to lower their voice so increasing the sidetone gain would amplify their own speech in their own ear.

In addition, various embodiments disclosed herein can use filters. For example, in FIG. 5, the filter settings may be set in step 502 as part of the monitoring system settings. The filters can include a low pass filter that causes sounds that exceed one or more of the thresholds but having a shorter duration to be excluded from having any adjustment of side tone gain associated with the one or more thresholds applied (or, in additional embodiments, one or more notifications associated with the one or more thresholds issued) but include sounds that have a longer duration. The amounts of duration are adjustable and may be set in the monitoring system settings in step 502. Advantageously, using one or more low pass filter(s) may prevent an adjustment or notification to occur when there is merely an anomalous violation of the threshold(s) (e.g., due to a sneeze or coughing fit).

Figure 6:
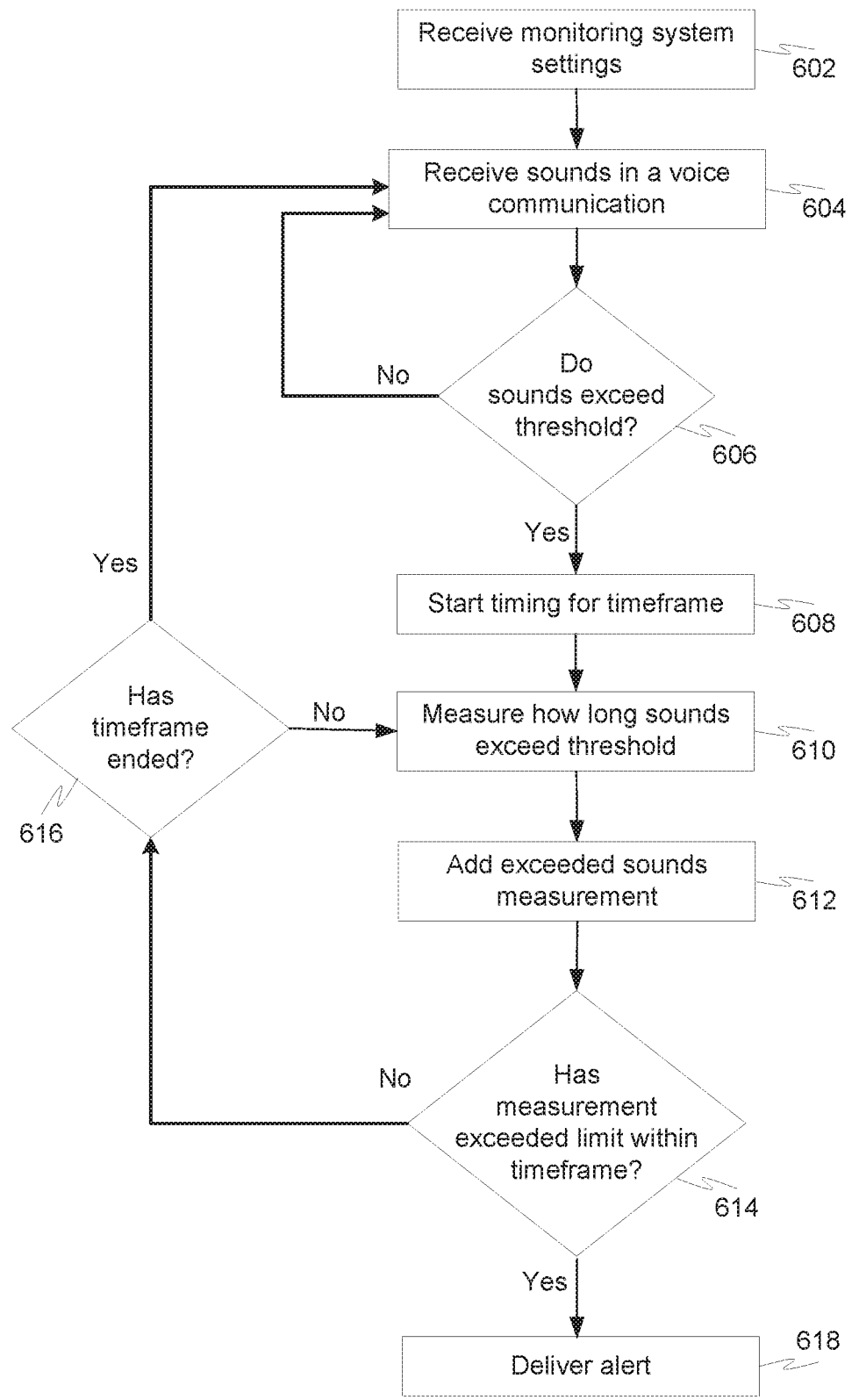
FIG. 6 is a second logic flow chart in accordance with embodiments of the present disclosure.

With reference now to FIG. 6, an exemplary logic flow chart will be described in accordance with at least some embodiments of the present invention. Steps shown in FIG. 6 (and components implementing the steps) may correspond to those shown and described in FIGS. 1-5. The description of FIG. 6 below sometimes refers to various components of FIGS. 1-5, by way of example, and the description is not limiting.

The method is initiated when monitoring system settings are received in step 602. Then, sounds in a voice communication are received in step 604. The sounds may be received at a device that is adjacent to a user making the sounds, for example by a microphone of the device. The received sounds are monitored by the monitoring system, and as discussed herein, the monitoring may be done at one or more devices (using a microphone or other method of detecting sound frequencies) and at any location. The monitoring may be continuous, in response to a user input at a device (e.g., an input from a user or administrator at step 602), and/or based on any criteria such as a known occupancy at the location. During the monitoring, incoming sounds are received and processed (e.g., compared to thresholds of acceptable volumes or other properties). Thresholds may be set based on any criteria, and multiple thresholds may be set with different actions taken at different thresholds, or the same actions taken at different thresholds.

The method continues with determining whether the sounds that were received exceeded a threshold in step 606. If the sounds do not exceed the threshold, the method returns to step 604 where the sounds continue to be received and monitored. If the sounds do exceed the threshold, the method continues to step 608 where timing the timeframe starts. In the illustrative example of FIG. 6, three minutes is used as the timeframe. The timeframe can be any amount and may be a time during which, if properties of the sound exceed certain thresholds for a specified cumulative amount of time (e.g., when all the times of the sounds that exceeded the threshold are added together as in step 612, discussed below), then an alert is invoked (discussed below).

By way of example, the timeframe in step 608 may be three minutes so that, in step 608, the timeframe starts timing for three minutes. Then, in step 610, an amount of time that the sound exceeds the threshold is measured. The measurement of the sound exceeding the threshold in step 610 may begin at the same time as the timing for the timeframe of three minutes starts in step 608. In step 612, an amount of time of the sounds exceeding the threshold are added to any other amounts of time of sounds exceeding the threshold. For example, if there are two different sounds that exceed the threshold (e.g., two different times during the three minute timeframe during which sound exceeds the threshold), then the two different sounds are added together. The term "different sounds" may refer to one type of sound (e.g., a single user's voice) or to different types of sounds (e.g., multiple users' voices, a user's voice with a sound from a machine, etc.). Thus, if the one or more sounds exceed the threshold for two seconds, then do not exceed the threshold for one minutes, and then exceeds the threshold for eighteen seconds, the lengths of time that the sounds exceed the threshold are added so that the two seconds are added to the eighteen seconds to obtain twenty seconds as the exceeded sounds measurement in step 612.

In step 614, the method determines whether the measured sounds that exceeded the threshold have exceeded a limit set for the timeframe. Thus, continuing with the example above, a limit for a cumulative amount of sounds exceeding the threshold may be one minute so that after the first time that the threshold is exceeded (e.g., for the two seconds) the method determines if the two seconds has exceeded the limit of one minute at step 614. The two seconds has not exceeded one minute, so the method proceeds to step 616, where it is determined if the three minute timeframe has ended. If the three minute timeframe has ended, the method returns to step 604. In this example, after the two second sound exceeding the threshold has occurred the three minutes is not over, so the method returns to step 610 to continue measuring sounds that exceed the threshold.

Continuing with the example, as discussed above, another sound that exceeds the threshold occurs for an amount of time of eighteen seconds in step 610. In step 612, the eighteen seconds is added to the two seconds to obtain a total of twenty seconds that sounds have exceeded the threshold. The method again returns to step 614, where the method determines whether the measured sounds that exceeded the threshold have exceeded the one minute limit set for the timeframe. Thus, the method determines if the twenty seconds (e.g., the two seconds added to the eighteen seconds) has exceeded the limit of one minute at step 614. The twenty seconds has not exceeded one minute, so the method proceeds to step 616, where it is determined if the three minute timeframe has ended. If the three minute timeframe has ended, the method returns to step 604. In this example, after the twenty second cumulative sound exceeding the threshold has occurred the three minutes is not over, so the method returns to step 610 to continue measuring sounds that exceed the threshold.

Still continuing with the example, as discussed above, another sound that exceeds the threshold occurs for an amount of time of fifty seconds in step 610. In step 612, the fifty seconds is added to the twenty seconds (e.g., the two seconds and the eighteen seconds) to obtain a total of seventy seconds that sounds have exceeded the threshold. The method again returns to step 614, where the method determines whether the measured sounds that exceeded the threshold have exceeded the one minute limit set for the timeframe. Thus, the method determines if the seventy seconds (e.g., the two seconds added to the eighteen seconds added to the fifty seconds) has exceeded the limit of one minute at step 614. The seventy seconds has exceeded one minute, so the method proceeds to step 618, where an alert is delivered. The alert may be an audible, visual, and/or haptic notification at a device where the sounds are received for the voice communication in FIG. 6.

Alternatively, if the fifty second violation of the threshold had not occurred in the example described above, the three minute timeframe could have expired at step 616 and the method would have proceeded back to step 604. The method would have begun again monitoring the received sounds at step 604, with the timing for the timeframe in step 608 being reset and the measurements and additions of times that sounds exceeded the threshold in steps 610 ad 612 also reset. In this scenario, no alert would have been delivered at step 618.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development locations that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    setting, by a microprocessor of a first device, at least one threshold for properties of at least one sound, wherein the at least one threshold comprises a first threshold, and wherein the at least one sound comprises a first sound;
    receiving the first sound at the first device;
    monitoring, by the microprocessor, changes in properties of the first sound over time at the first device;
    detecting, by the microprocessor, a first violation of the first threshold for the first sound; and
    providing, by the microprocessor, a first notification based on the detection of the first violation.

2. The method of claim 1, wherein the first sound is a voice of a first user, and wherein the first notification is an increase in a side tone gain at the first device.

3. The method of claim 2, wherein the first user sets the first threshold to be a first level of a volume of the voice of the first user.

4. The method of claim 1, wherein a first user sets a second threshold for the sound of the voice, and further comprising detecting a second violation of the second threshold and providing a second notification.

5. The method of claim 1, wherein the at least one sound further comprises a second sound, wherein the monitoring comprises monitoring changes in properties of the first sound over time at the first device and changes in properties of the second sound over time at the first device.

6. The method of claim 1, wherein the monitoring comprises monitoring changes in properties of the first sound over time at the first device and changes in properties of a second sound over time at the first device, and wherein the first notification is based on the detection of the first violation and detection of a second violation based on the second sound.

7. The method of claim 1, wherein the at least one sound further comprises a second sound, wherein first sound is a voice of a first user and the second sound is a voice of a second user, and wherein the monitoring comprises monitoring changes in properties of the first sound over time at the first device and changes in properties of the second sound over time at the first device.

8. The method of claim 7, wherein the at least one threshold further comprises a second threshold, wherein the first threshold is a first level of a volume of the sounds, wherein the second threshold is a second level of the volume of the sounds, and wherein the detecting the first violation comprises detecting at least one of the first threshold and the second threshold.

9. The method of claim 1, wherein the at least one threshold further comprises a second threshold, wherein the first threshold is a time frame, and wherein the second threshold is a first level of a volume of the sounds.

10. The method of claim 9, wherein the time frame starts at a first detection of the second threshold, wherein the first violation comprises detecting the second threshold a certain number of times within the time frame, and wherein if the certain number is not detected within the time frame, then the time frame starts over at an additional detection of the second threshold.

11. A system, comprising:
    one or more processors;
    memory storing one or more programs for execution by the one or more processors, the one or more programs comprising instructions for:
    setting at least one threshold for properties of at least one sound, wherein the at least one threshold comprises a first threshold, and wherein the at least one sound comprises a first sound received at a first device;

monitoring changes in properties of the first sound over time at the first device;

detecting a first violation of the first threshold for the first sound; and providing a first notification based on the detection of the first violation.

12. The system of claim 11, wherein the first notification is an increase in a side tone gain at the first device.

13. The system of claim 11, wherein a first user sets the first threshold to be a first power level measured at a microphone of the first device.

14. The system of claim 13, wherein the power level measures a volume of the voice of the first user.

15. The system of claim 11, wherein a first user sets a second threshold for the sound of the voice, wherein the second threshold is a second level of the volume of the voice of the first user, and further comprising, after providing the first notification, detecting a second violation of the second threshold and providing a second notification.

16. The system of claim 11, wherein a first user sets a second threshold, wherein the detecting the first violation comprises detecting at least one of the first threshold and the second threshold, wherein the first notification is a variable alert type, and wherein the variable alert type depends whether the first threshold is detected or the second threshold is detected.

17. The system of claim 11, wherein the at least one threshold further comprises a second threshold, wherein the first threshold is a time frame, wherein the second threshold is a first level of a volume of the sounds, and wherein the detecting the first violation comprises detecting the first violation of the first threshold and the second threshold for the sounds.

18. The system of claim 17, wherein the time frame starts at a first detection of the second threshold, and wherein the first violation comprises detecting the second threshold a certain number of times within the time frame.

19. The system of claim 18, wherein if the certain number is not detected within the time frame, then the time frame starts over at an additional detection of the second threshold.

20. A tangible and non-transient computer readable medium comprising microprocessor executable instructions that, when executed by the microprocessor, perform at least the following functions:

setting at least one threshold for properties of at least one sound, wherein the at least one threshold comprises a first threshold, and wherein the at least one sound comprises a first sound received at a device;

monitoring changes in properties of the first sound over time at the first device;

detecting a first violation of the first threshold for the first sound; and providing a first notification based on the detection of the first violation.

\* \* \* \* \*